United States Patent [19]

Quintel

[11] 4,121,406
[45] Oct. 24, 1978

[54] GRASS CUTTING MACHINE

[76] Inventor: Francis William Quintel, 564 Port Rd., Allenby Gardens, South Australia, Australia

[21] Appl. No.: 723,519

[22] Filed: Sep. 15, 1976

[30] Foreign Application Priority Data

Sep. 19, 1975 [AU] Australia .............................. PC3246

[51] Int. Cl.² ...................... A01D 53/14; A01D 55/18
[52] U.S. Cl. ....................................... 56/13.4; 56/256
[58] Field of Search ..................... 56/13.3, 13.4, 17.1, 56/17.4, 256, 294

[56] References Cited

U.S. PATENT DOCUMENTS

| 2,790,294 | 4/1957 | Marich | 56/294 |
| 2,811,004 | 10/1957 | Borrow | 56/13.4 |
| 2,860,475 | 11/1958 | Richard | 56/12.7 |
| 3,031,836 | 5/1962 | Witt | 56/13.4 |
| 3,530,653 | 9/1970 | Ott | 56/17.1 |
| 3,935,695 | 2/1976 | Merry | 56/13.4 |

Primary Examiner—Russell R. Kinsey
Attorney, Agent, or Firm—Brown & Martin

[57] ABSTRACT

A grass cutting machine having blades which themselves constitute air impellers and which have outer edges sloping outwardly away from shaft bearings in both an axial direction and a radial direction so as to deflect grass growing alongside the fence into the path of the cutter blades.

10 Claims, 5 Drawing Figures

GRASS CUTTING MACHINE

This invention relates to a machine which is useful for the cutting of grass, particularly adjacent a fence, wall, tree or hedge, or at other areas where a normal lawn mower is not capable of properly controlling grass growth.

BACKGROUND OF THE INVENTION

One of the time consuming jobs which is faced by gardeners when cutting lawn is cutting the edges and cutting adjacent walls and other places where the grass grows in very close proximity to a wall. This grass is difficult to deal with because a lawn mower quite often does not reach closely enough to a wall to sever the grass, and previously proposed edge cutters have been unsuitable. The main reason is the tendency of the grass to lie contiguous with the wall, tree or other obstruction, and particularly if a fence is a corrugated iron fence, much of the grass lies within the valleys of the corrugations.

BRIEF SUMMARY OF THE INVENTION

In Australian Pat. No. 485,038 in the name of Grass Disposals Pty. Ltd., (wherein the Applicant herein was inventor), there was described a machine wherein a plurality of cutter blades of 'L' shape were secured to the blades of an air inducer, or blower, on a frame supported by wheels. That device functioned to cause grass to be deflected laterally into the path of travel of the blades, but it has been found that use of cutter blades themselves functioning as the air impeller is even more effective, if each blade has an outer edge which slopes outwardly away from the shaft bearings both in an axial direction and in a radial direction.

With the object of providing a grass cutting machine which will more effectively cut grass, the invention consists of a grass cutting machine comprising a frame, a bearing in the frame, a shaft journalled in the bearing for rotation about a generally transverse axis, power means on the frame, drive means coupling the power means to the shaft for rotationally driving the shaft, a plurality of cutter blades radiating outwardly from the shaft, each cutter blade having an outer edge which slopes outwardly away from said bearing in both an axial direction and a radial direction, the cutter blades when driven constituting air impellers which cause an air flow axially towards the shaft bearing and radially outwardly past the cutter blades, a shroud extending partly around the cutter blades, a discharge aperture in the shroud, and wheels supporting the frame at a sufficient height above the ground that the cutter blades do not encounter the ground upon rotation.

BRIEF DESCRIPTION OF THE DRAWINGS

An embodiment of the invention is described hereunder in some detail with reference to and is illustrated in the accompanying drawings, in which.

DETAILED DESCRIPTION OF THE PREFERRED EMBODIMENT

Figure 3:
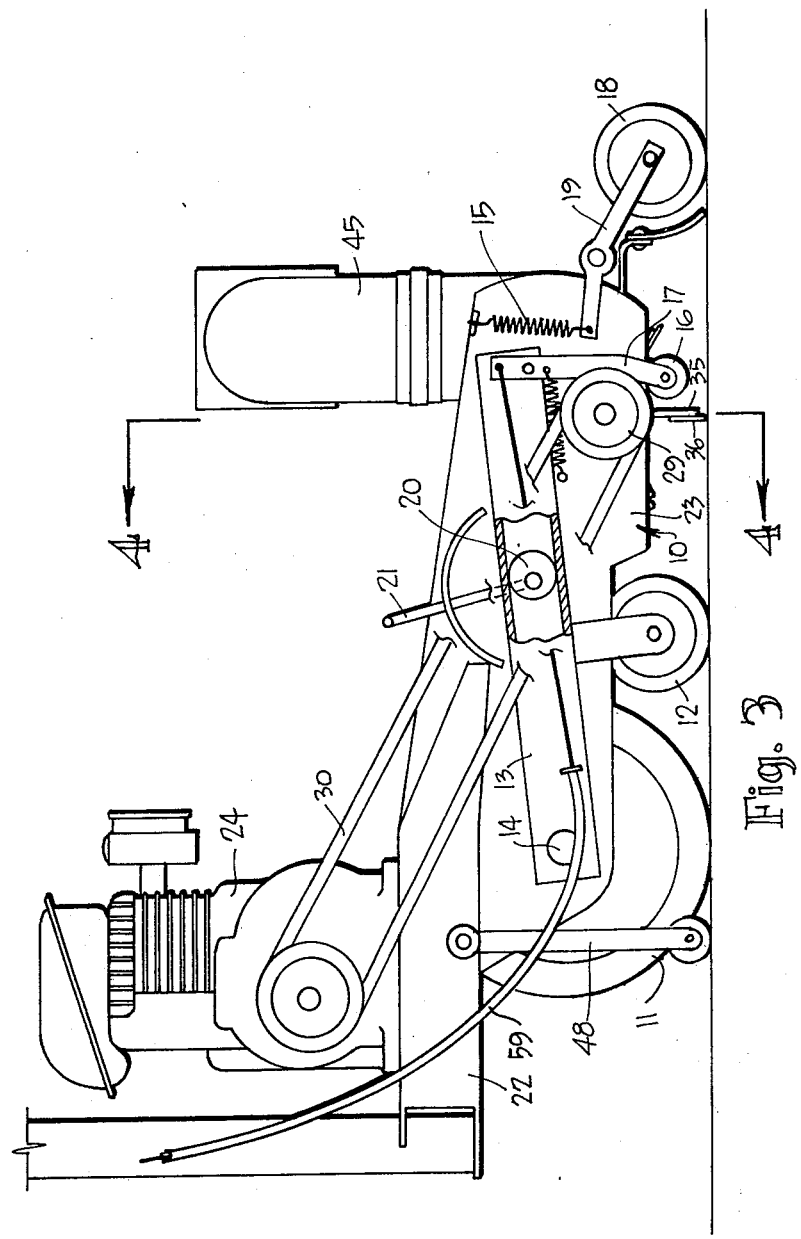
FIG. 3 is a fragmentary side elevation to a further enlarged scale which illustrates the wheels which support the frame so that the cutter blades do not encounter the ground upon rotation, (but omitting the retractable stand)

In this embodiment a frame 10 is supported by a main rear wheel 11 rotatable about an axis on the frame; a second main wheel 12 rotatable about an axis on a height control arm 13 which is pivoted on a pin 14 on frame 10, the second wheel 12 being forward of the centre of gravity of the machine; a third wheel 16 which is a height control wheel, being on the lower end of an arm 17 which is a positioning arm pivoted to the front, swinging end of height control arm 13; and a fourth (front) wheel 18 carried on a spring loaded arm 19 pivoted to the front end of the main frame 10. The main wheels 11 and 12 function to support the frame 10, and by pivoting the arm 13 about its pin 14, the height of the cutter above the ground can be adjusted. This pivotal movement is controlled by a cam 20 and a control arm 21 as illustrated in FIG. 3. The cam 20 is carried on a shaft rotatable in bearings in the frame, and the arm 21 is secured to the cam 20 or its shaft, so that movement of arm 21 causes rotation of cam 20 between plates on arm 13, as shown in FIG. 3, which causes consequential pivotal movement of arm 13 about its pivot pin 14. The main wheels 11 and 12 both have relatively wide tires which are of generally cylindrical shape, this feature simplifying tilt control of the machine when in use. In contrast, the height control wheel 16 is narrow, being required solely for ensuring the cutter does not encounter the ground (should the machine pass over a bump in the ground) and can be retracted by pivoting the arm 17, as described below. The wheel 16 would be retracted, for example, when high dense grass is to be cut, say adjacent a flat curb. The arm 19 carrying the front wheel is normally retained in a "down" position by its spring 15, and in this position cooperates with the rear main wheel 11 to support the cutter (which is intermediate the wheels) above the ground, avoiding short sharp vertical excursions of the cutter which might otherwise occur without wheel 18. However the arm 19 can be caused to pivot by the operator applying manual pressure to the machine handle bars (described below) when that is required.

Figure 4:
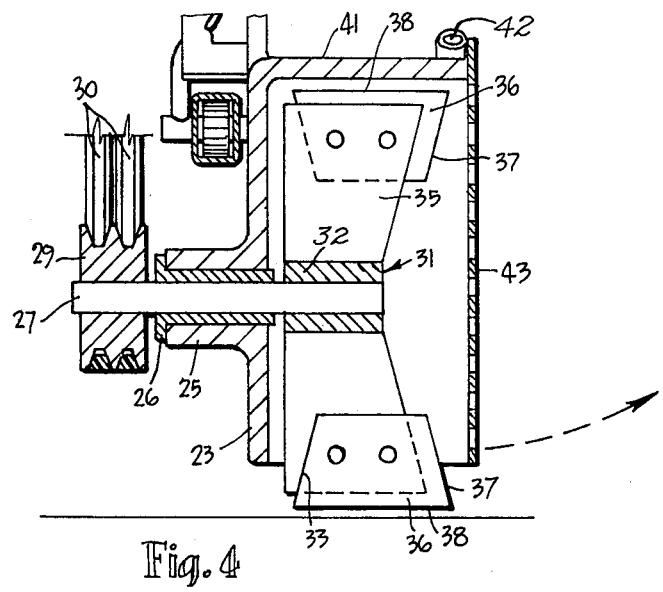
FIG. 4 is a fragmentary section taken on line 4—4 of FIG. 3.

The frame 10 is provided with a platform plate 22 and a depending side plate 23, the platform plate 22 supporting an engine, the depending side plate 23 supporting a boss 25 (FIG. 4) which carries a bearing 26, there being a shaft 27 journalled for rotation about a transverse axis (with respect to travel direction) in the bearing 26 and projecting outwardly on both sides of the boss 25. On the drive side of the boss the shaft 27 carries on it a driven pulley 29 which is driven by means of V belts 30 extending from the engine 24, while the other end of the shaft mounts an impeller 31. The impeller 31 has a central boss or hub 32 with a series of impeller mounting arms 35 the axially inner edges of which extend radially and the axially outer edges of which slope in the opposite direction, that is, outwardly away from the bearing 26 in both an axial direction and a radial direction, as illustrated in FIG. 4. Each impeller arm 35 has bolted to it a cutter blade 36, the cutter blades 36 extending radially outwardly and axially outwardly by a small amount from the impeller mounting arms 35 and therefore themselves functioning as air impellers. The outer edges 37 of the cutter blades 36 also slope outwardly away from bearing 26 in an axial and in a radial direction, while the radially outer edges 38 are all parallel to the axis of rotation of shaft 27.

Figure 2:
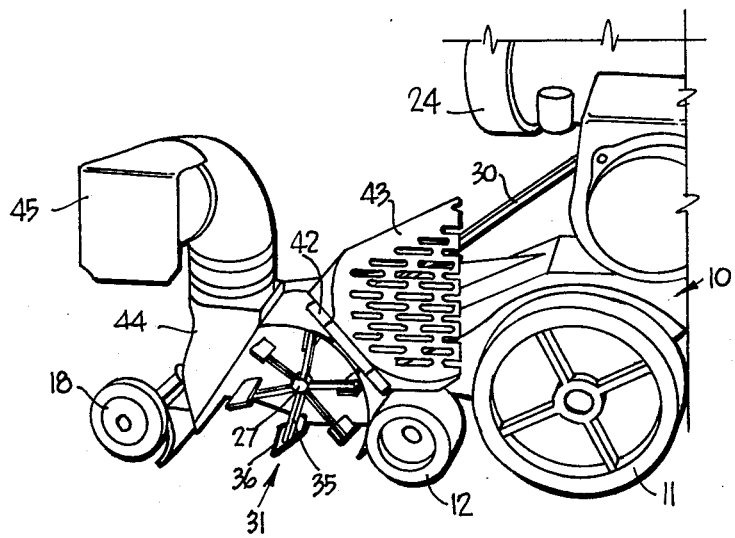
FIG. 2 is an enlarged fragmentary perspective view of the cutter blade side of same with the perforate guard plate in an inoperative position.

The side plate 23 of frame 10 merges into an upper plate 41 which is at right angles to plate 23 and forms portion of a shroud, and is arranged to direct air flow imparted by the impeller action of the cutter blades 36, the upper plate 41 having a hinge 42 secured to it, the hinge 42 hingedly supporting a perforate guard plate 43, which, as shown in FIG. 2, can be hinged upwardly from one position where it extends across an access opening in the side of the frame at the location of the cutter blades, to a retracted position remote from the access opening, occupied for example when the machine is to be used adjacent a fence and it is desired that the air draft should deflect grass alongside the fence through the access opening in the side of the frame which is thereby exposed, and into the path of the cutter blades 36. The shroud is completed by a front plate 44 (FIG. 2) and a discharge spout 45 arranged to direct cut grass into a window (or a grass catcher, if used). The spout 45 can be rotated as required.

Figure 1:
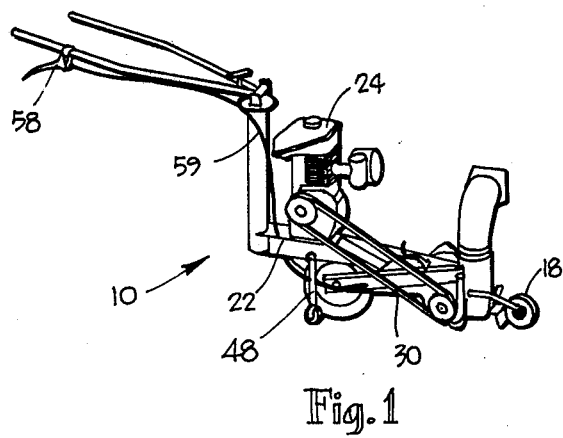
FIG. 1 is a perspective view of the drive side of a grass cutting machine.

The wheels 11, 12, 16 and 18 are carried on respective axles each of which is journalled in transversely extending bearings so that the frame can be wheeled along and may be tilted to left or to right. When the frame is tilted to the right a short retractable arm 48 (FIG. 1) engages the ground to retain the frame in a slanting position. The arm 48 is shown to also have a wheel thereon, but this is inessential.

In operation, the device can be wheeled alongside the fence, wall or other obstruction with the guard plate 43 retracted. The function of the impeller blades is to draw grass into the path of the cutter blades, and as the grass is severed it is directed through the discharge spout 45. It may be collected in a container or the spout may be utilised for establishing a windrow. When the device is to be utilised near a sloping fence or wall, the tandem arrangement of the wheels enables the device to be tilted appropriately. When the third wheel 16 is dropped into a ground engaging position, it is of such diameter that the cutters sweep close to but do not encounter the ground, and the device can therefore be used for trimming grass which for example grows over a concrete edge member, kerb, path or the like.

Figure 5:
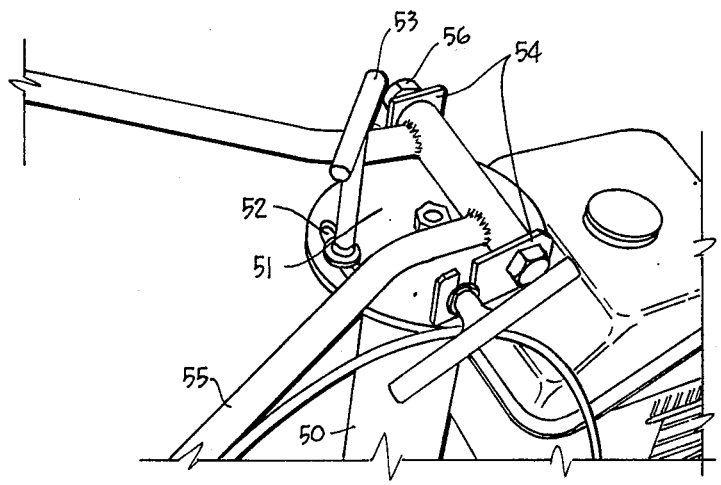
FIG. 5 is a fragmentary perspective of the handle mounting means.

Referring to FIG. 5, the frame 10 has an upstanding post, 50 thereof which terminates in a circular plate 51 containing an arcuate slot 52 through which a 'T' bar locking bolt 53 passes, the plate 51 being rotatable with respect to post 50 but its position being adjustable by movement of the plate with respect to the 'T' bar. The plate has two upstanding lugs 54 thereon, and a handlebar 55 is pivoted with respect to lugs 54 by means of a pivot bolt 56. This arrangement provides means whereby the handle-bar can be quickly and easily fixed to a convenient height for an operator, and can be pivoted so as to be clear of a fence, for example, when the machine is used adjacent that fence. The handle-bar carries a hand lever 58 which controls retraction of arm 17 by way of a concentric cable (Bowden cable) 59, which, when controlled by hand lever 58, causes the arm to pivot about its pivotal mounting on the front (swinging) end of arm 13.

Although the above invention will be seen to be exceedingly simple it has been found to be most effective in reducing labour requirements for the trimming of grass alongside obstructions.

I claim:

1. A grass cutting machine comprising a frame, a bearing in the frame, a shaft journalled in the bearing for rotation about a generally transverse axis, power means on the frame, drive means coupling the power means to the shaft for rotationally driving the shaft, a plurality of cutter blades, means securing the cutter blades to the shaft, the cutter blades radiating outwardly from the shaft, each cutter blade having an outer edge which slopes outwardly away from said bearing in both an axial direction and a radial direction, the cutter blades when driven constituting air impellers which cause an air flow axially towards the shaft bearing and radially outwardly past the cutter blades, said frame comprising a shroud extending partly around the cutter blades, said shroud defining an access opening in the side of the frame at the location of the cutter blades, a discharge aperture in the shroud, wheels supporting the frame at a sufficient height above the ground that the cutter blades do not encounter the ground upon rotation, and transversely extending axles supporting the wheels for rotation about respective transverse axes.

2. A grass cutting machine according to claim 1 further comprising a hinge on the frame and a perforated plate secured to the hinge and hingedly movable thereby from one position where it extends across said access opening in the side of the frame as a guard plate to a second position which is a retracted position remote from the access opening.

3. A grass cutting machine according to claim 1 wherein each cutter blade has a radially outer edge which is parallel to the axis of shaft rotation.

4. A grass cutting machine according to claim 1 further comprising a discharge spout rotationally positionable on said shroud and carried thereby, and in communication with said discharge aperture.

5. A grass cutting machine according to claim 1 wherein said wheels comprise at least one wheel having a relatively wide tire of cylindrical shape and at least one wheel which is relatively narrow positioned forwardly of the wheel with the wide tire.

6. A grass cutting machine according to claim 1 further comprising a height control arm, pivot means mounting the height control arm to the main frame near the rear end thereof for raising and lowering of the height control arm, and wherein there are two main wheels arranged in tandem each of which has a relatively wide tire of cylindrical shape, one of said main wheels being a rear wheel rotational about an axis which is fixed relative to the main frame and the other of which is positioned forwardly of the rear wheel and is rotational about an axis fixed relative to the height control arm, there being at least one further wheel which is relatively narrow and which is forward of the main wheels.

7. A grass cutting machine according to claim 6 further comprising a positioning arm, pivot means mounting the positioning arm to the front end of said height control arm, a spring loaded arm forward of said positioning arm and having further pivot means pivoting the spring loaded arm to the front end of the main frame, and wherein there are two said further wheels, the rear one of which is carried on the lower end of said positioning arm and to one side of said cutter blades thereby being arranged to prevent said cutter blades engaging the ground, and the other said further wheel being carried on the lower end of said spring loaded arm.

8. A grass cutting machine according to claim 6 further comprising a positioning arm, pivot means mounting the positioning arm to the front end of said height control arm, a spring loaded arm forward of said positioning arm and having further pivot means pivoting the spring loaded arm to the front end of the main frame, and wherein there are two said further wheels, the rear one of which is carried on the lower end of said positioning arm and to one side of said cutter blades thereby being arranged to prevent said cutter blades engaging the ground, and the other said further wheel being carried on the lower end of said spring loaded arm, and a retractable cable coupled to said height control arm operable to move said height control arm to a retracted position.

9. A grass cutting machine according to claim 1 further comprising a handle-bar, and adjustable pivot means joining the handle-bar to the frame and arranged for handle-bar adjustment laterally about a vertical axis and vertically about a horizontal axis.

10. A grass cutting machine comprising a frame, a bearing in the frame, a shaft journalled in the bearing for rotation about a generally horizontal transverse axis, power means to the shaft for rotationally driving the shaft, a plurality of cutter blades having radial cutting edges parallel to the axis of rotation and lying in planes parallel to a plane containing the axes of rotation of said cutter blades, a shroud on said frame extending partly around the cutter blades and defining a generally vertical opening at the location of the cutter blades, means for securing the cutter blades to the shaft to radiate outwardly therefrom and so constructed and arranged that when the shaft is rotationally driven by the power means and the shroud is positioned with said access opening adjacent grass to be cut, the driven blades constitute air impellers which cause an axial air flow which draws grass through the access opening and into the path of said cutter blades, a discharge opening in the shroud, and frame support wheels rotational about respective transverse axes supporting the frame.

* * * * *